United States Patent
Rowse et al.

(10) Patent No.: US 6,892,520 B2
(45) Date of Patent: May 17, 2005

(54) FOLDABLE HAY RAKE

(75) Inventors: Dan D. Rowse, Ord, NE (US); Rodney D. Rowse, O'Neill, NE (US)

(73) Assignee: Rowse Hydraulic Rakes Co., Inc., Burwell, NE (US)

( * ) Notice: Subject to any disclaimer, the term of this patent is extended or adjusted under 35 U.S.C. 154(b) by 0 days.

(21) Appl. No.: 10/640,959

(22) Filed: Aug. 14, 2003

(65) Prior Publication Data

US 2005/0039432 A1 Feb. 24, 2005

(51) Int. Cl.[7] .............................................. A01D 76/00
(52) U.S. Cl. ........................................ 56/377; 56/375
(58) Field of Search .................. 56/375, 378, 397, 56/365, DIG. 10, DIG. 21, 367, 372, 377, 380, 384, 385

(56) References Cited

U.S. PATENT DOCUMENTS

| | | | |
|---|---|---|---|
| 3,568,423 A | * | 3/1971 | Hale et al. ..................... 56/377 |
| 4,723,401 A | | 2/1988 | Webster et al. |
| 4,723,402 A | | 2/1988 | Webster et al. |
| 4,723,403 A | * | 2/1988 | Webster ........................ 56/377 |
| 5,305,590 A | * | 4/1994 | Peeters ......................... 56/377 |
| 5,540,040 A | * | 7/1996 | Peeters ......................... 56/377 |
| 5,598,691 A | * | 2/1997 | Peeters ......................... 56/377 |
| 5,899,055 A | | 5/1999 | Rowse et al. |
| 6,463,726 B1 | | 10/2002 | Helfer et al. |

* cited by examiner

Primary Examiner—Robert E Pezzuto

(57) ABSTRACT

A foldable hay rake has two rake arms comprised of two or more arm members with rake wheels thereon. The hay rake arms are pivotally secured together to a pivot assembly to pivot in a vertical plane. The pivot assembly is pivotally secured for pivoting in a horizontal plane to a vertical post having positioning wheels at a lower end. An upper end is pivotally secured to outer ends of wing arms comprised of parallelogram members which are pivotally secured to a central base frame, which has a power cylinder to pivot the wing arms in a horizontal plane.

26 Claims, 21 Drawing Sheets

FOLDABLE HAY RAKE

FIELD OF THE INVENTION

This invention relates to large foldable hay rakes that can move through a hay field of cut hay in a swath up to 40 feet wide or greater to turn the hay and present the hay in elongated windrows ready for harvesting or baling, usually in large round or square bales weighing almost a ton or more.

BACKGROUND OF THE INVENTION

This invention is an improvement over prior and existing large foldable hay rakes such as that shown in U.S. Pat. No. 5,899,055.

Existing foldable hay rakes typically have a pair of wheel supported elongated rake arms that are pivotal along their lengths, and capable of being pivoted individually with respect to each other. While substantially advancing the art of hay raking, these devices have certain shortcomings. Among them are that the rakes are cumbersome to use both in operation and for travel; they require substantial room for turning and maneuvering; they do not adapt well to uneven ground; they are susceptible to damage in the field, and they do not always well cover the field to deal with all the hay that is being raked.

It is therefore a principal object of this invention to provide a foldable hay rake that will overcome the foregoing problems, and which will enhance the performance and efficiency of raking hay.

A further object of this invention is to provide a foldable hay rake wherein the substantial weight of the rake is held by centrally located positioning wheels.

Another object of this invention is to provide a foldable hay rake that can be easily observed from the towing tractor while in operation, and which can individually rake and turn separate rows of cut hay, or to combine such rows into a single row for baling.

These and other objects will be apparent to those skilled in the art.

SUMMARY OF THE INVENTION

An elevated flat base frame has a hydraulically operated T-beam which has a laterally extending beam which is moved forwardly and rearwardly to move a pair of elongated rake arms back and forth from a position parallel to the direction of travel of the rake, to a V-shaped configuration for the hay raking operation.

The rake arms are comprised of at least two arm members pivotally and universally hinged at adjacent ends and supported at the movable joint therebetween by a pair of positioning wheels. The wheels are connected to the lower end of a support post, with the upper ends being pivotally secured to a parallelogram wing structure that extends from the upper ends of each post to a pivotal connection with the base frame. The lateral extending member of the T-beam has struts that extend from the ends of the lateral beam to pivot the parallelogram-configured wing structures, and hence the support posts and rake arms outwardly from the base frame. Hydraulic cylinders between the rake arms and the hinged connection of the members of the rake arms determine the angular position of the rake arms.

Castor wheels are located at the forward and rearward ends of the rake arms to facilitate their movement to and from the angular raking position of the rake arms.

DESCRIPTION OF THE PREFERRED EMBODIMENTS

Figure 5:
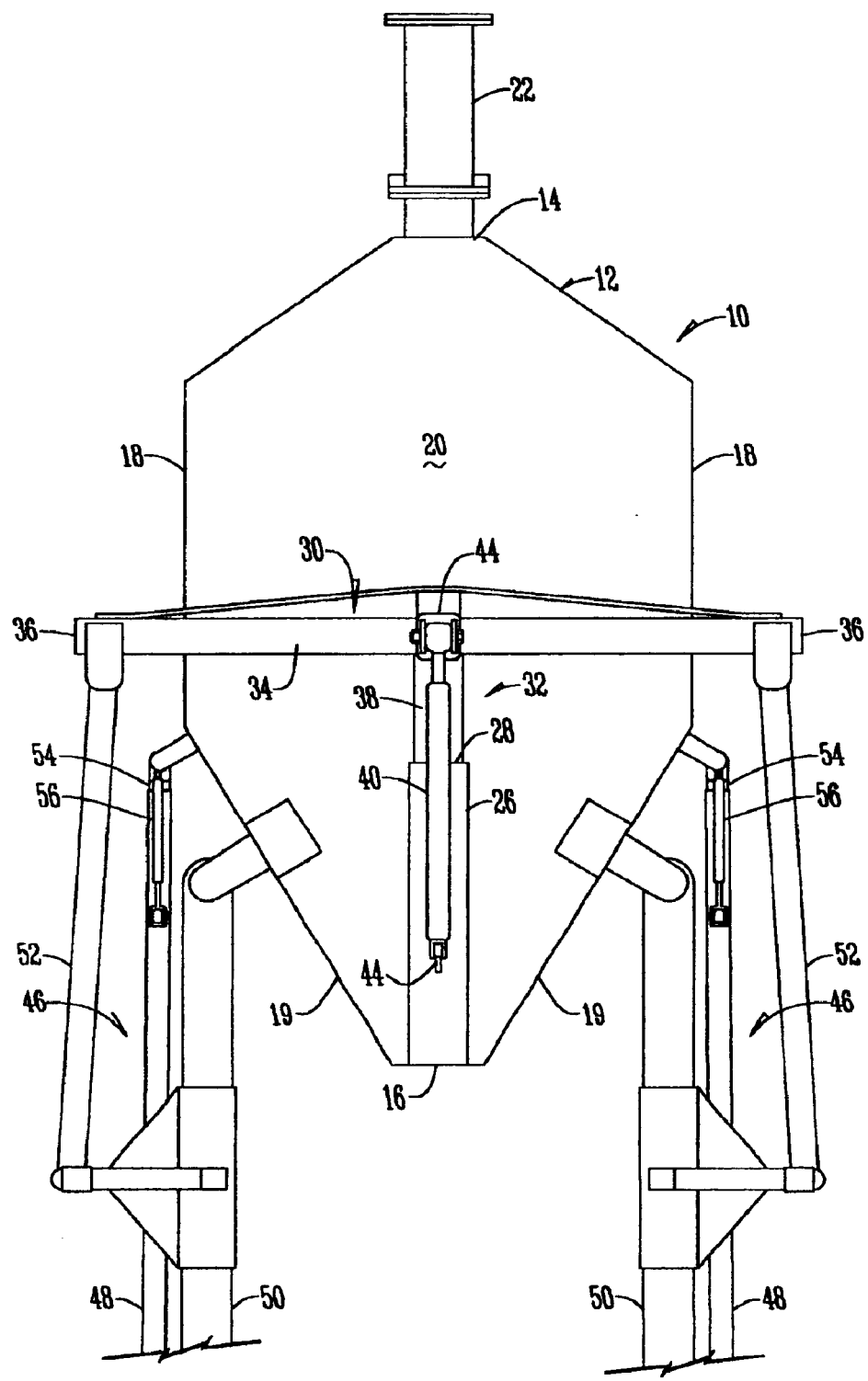
FIG. 5 is an enlarged scale plan view of the base frame of this invention while in the travel mode of FIG. 1.
Figure 17:
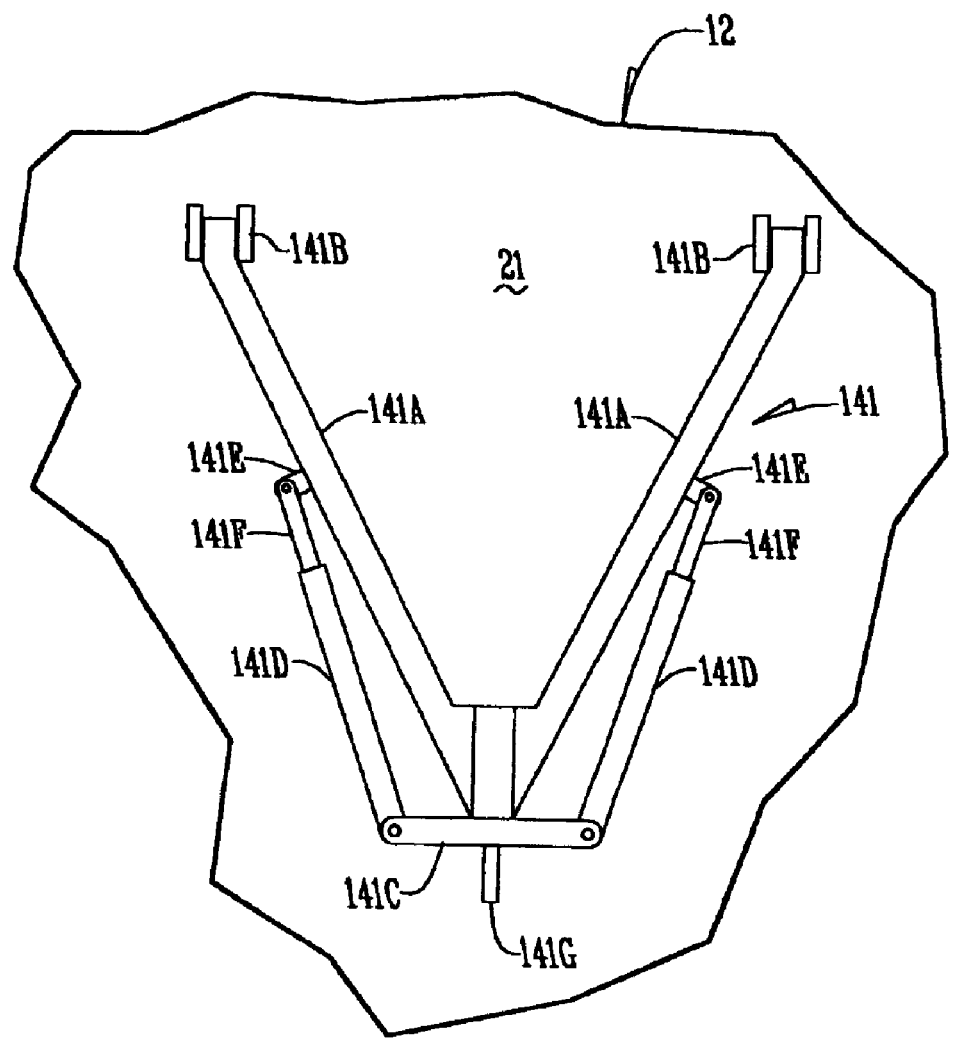
FIG. 17 is a bottom plan view of the stabilizer frame of the invention.
Figure 18:
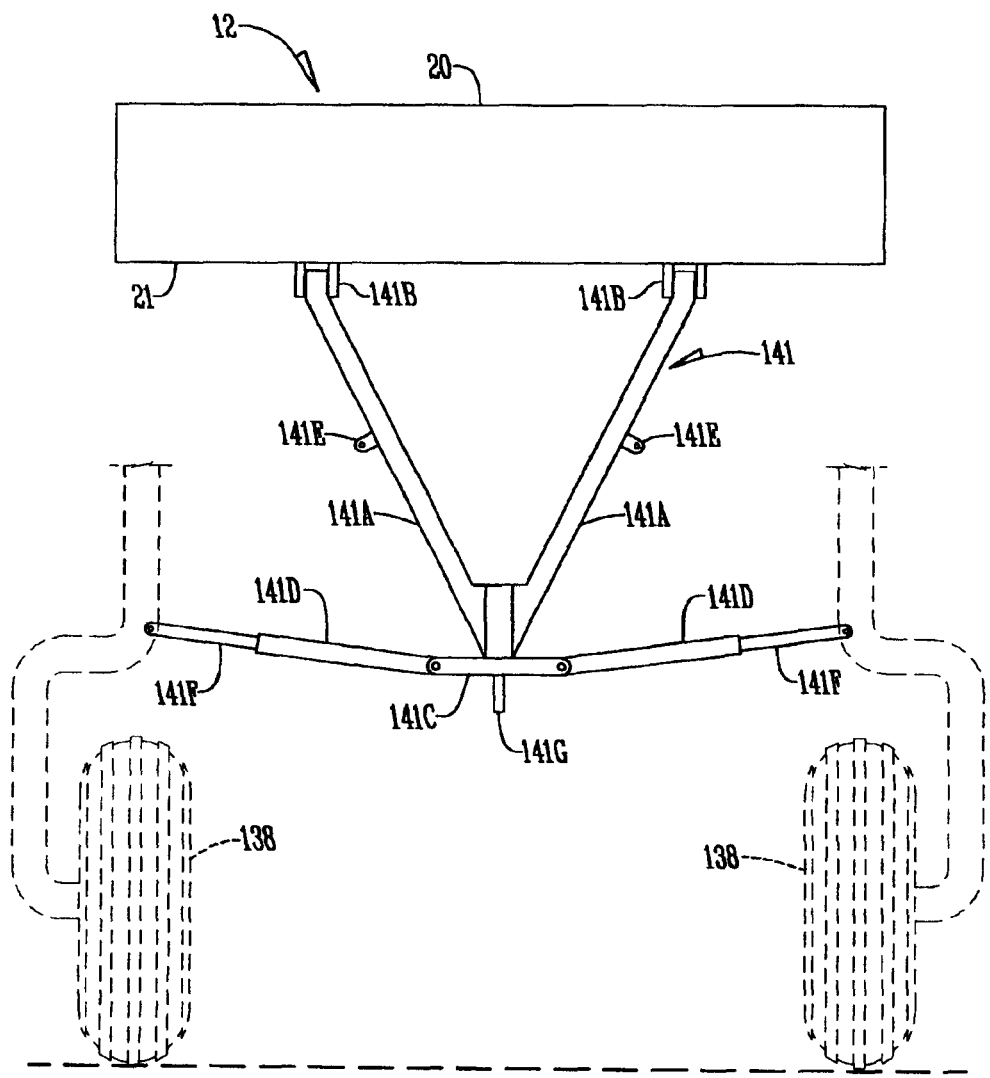
FIG. 18 is a forward elevational view of the stabilizer frame of FIG. 17 in its lowered operational condition.

The hay rake 10 has a base frame 12 which is normally in a substantially horizontal position. (FIG. 5). Base frame 12 has a forward end 14, a rearward end 16, parallel sides 18, diagonal sides 19, an upper flat deck 20, and a bottom plate 21 (FIGS. 17, 18). A tongue 22 is rigidly secured to the forward end 14 and extends downwardly and forwardly to be connected to the drawbar of a conventional farm tractor 24.

With reference to FIGS. 5–8, a hollow guide housing 26 is rigidly secured to and extends from the rearward end of base frame 12 in a forward direction along the centerline of the base frame and terminates at an open forward end 28. A T-beam 30 comprised of a forwardly extending beam 32 is slidably mounted in housing 26 with its forward end terminating in a transverse forward beam 34 with outer ends 36. The beam 32 is covered with a layer of vinyl plastic 38 or the like to enhance the sliding movement of beam 32 in housing 26 without the need for lubrication.

Figure 6:
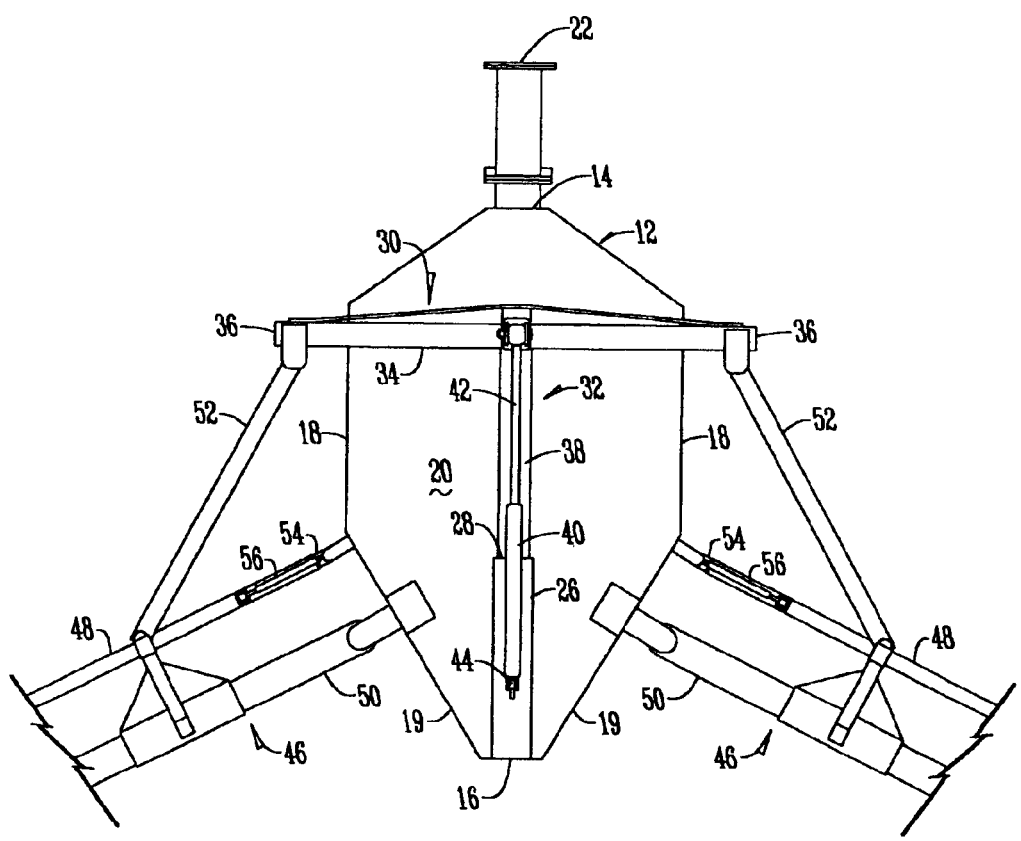
FIG. 6 is a plan view similar to that of FIG. 5 but shows the base frame in the positions of FIG. 2 and FIG. 3.
Figure 7:
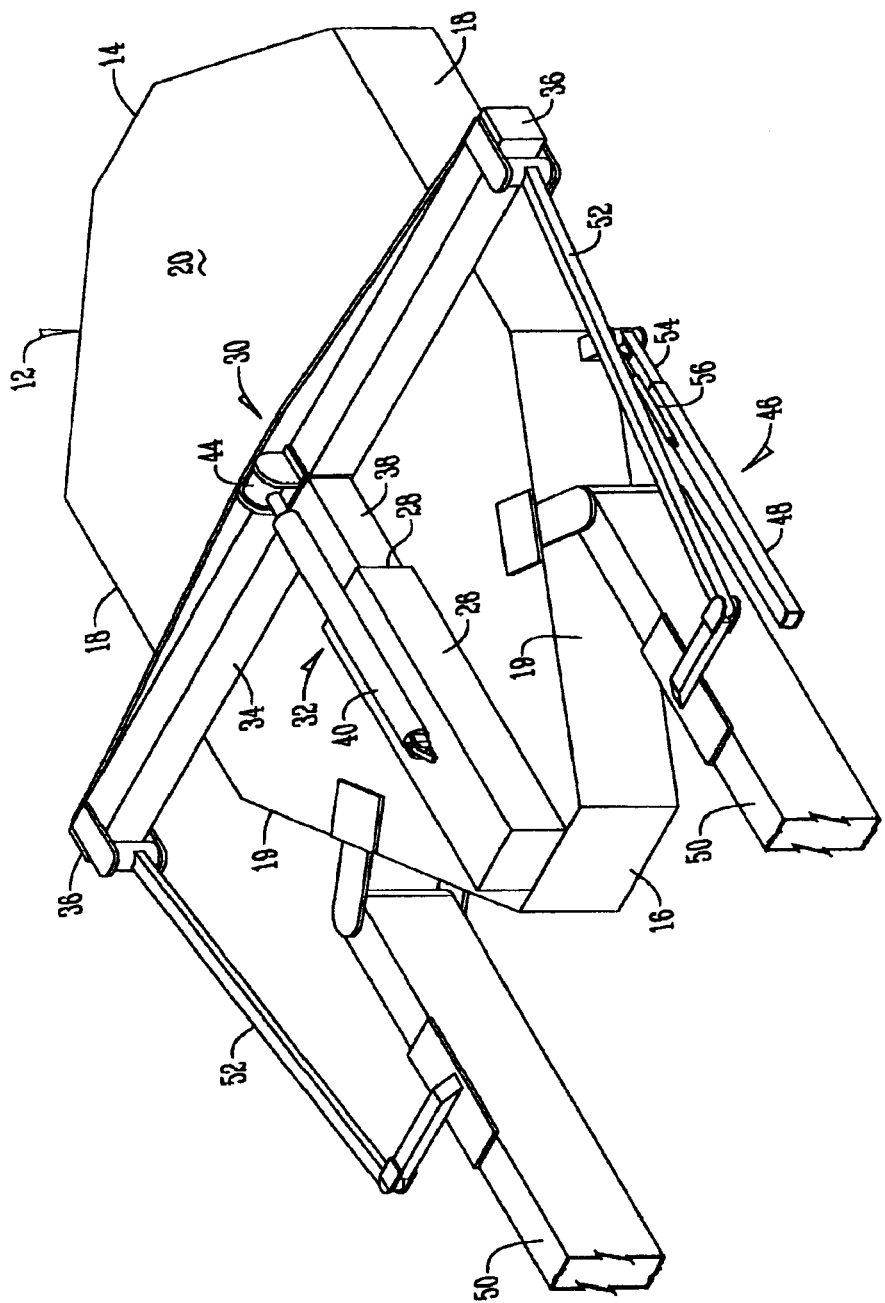
FIG. 7 is a side perspective view of FIG. 5.
Figure 8:
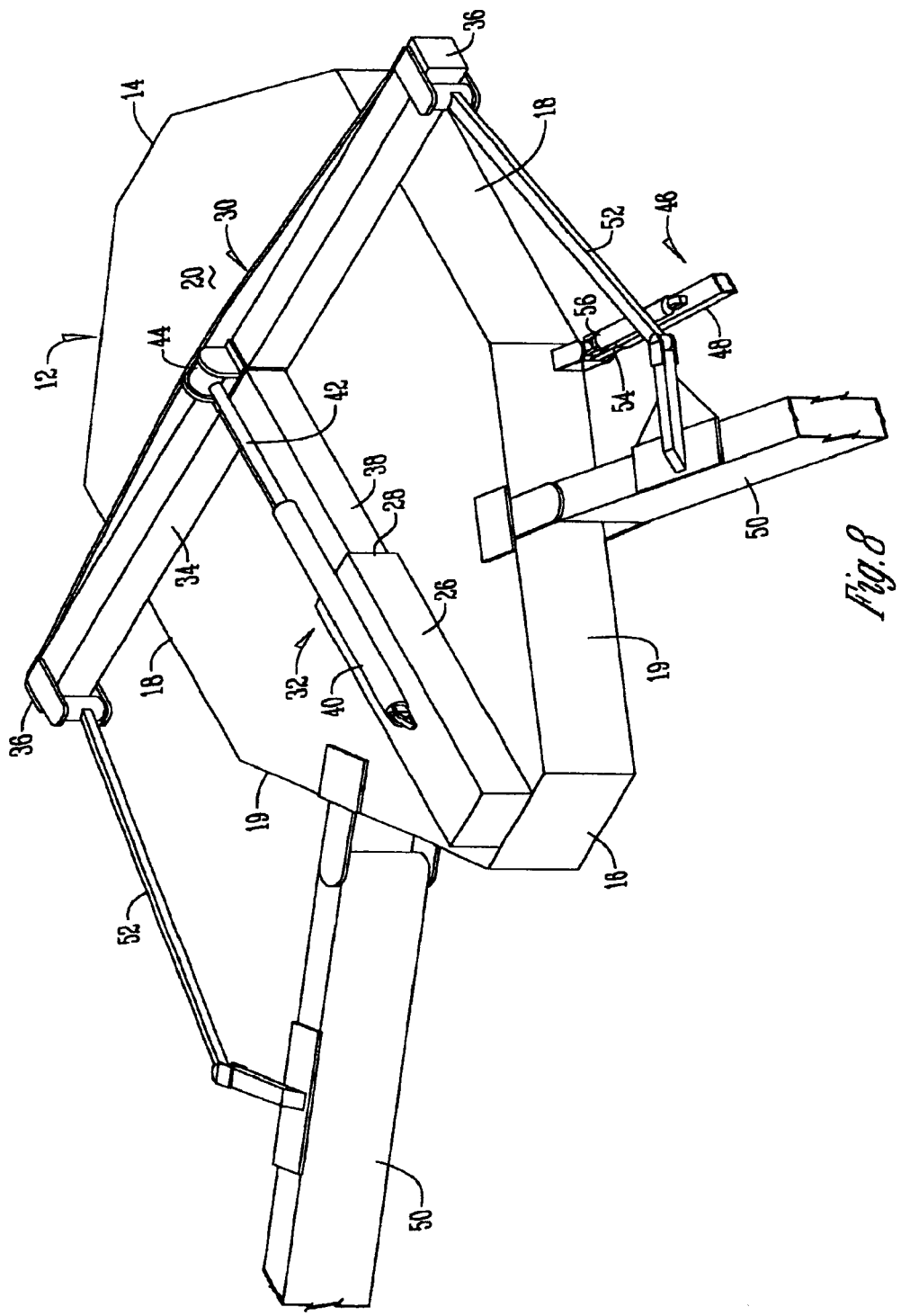
FIG. 8 is a side perspective view of FIG. 6.

A hydraulic cylinder 40 (FIGS. 7 and 8) is rigidly secured to housing 26 and includes a conventional forwardly extending rod 42. The forward end of rod 42 (FIG. 7) is connected in any convenient way to the center of transverse beam 34 so that the cylinder when actuated can move the T-beam 30 from a rearward position (FIGS. 5 and 7) to a forward position (FIGS. 6 and 8).

Figure 1:
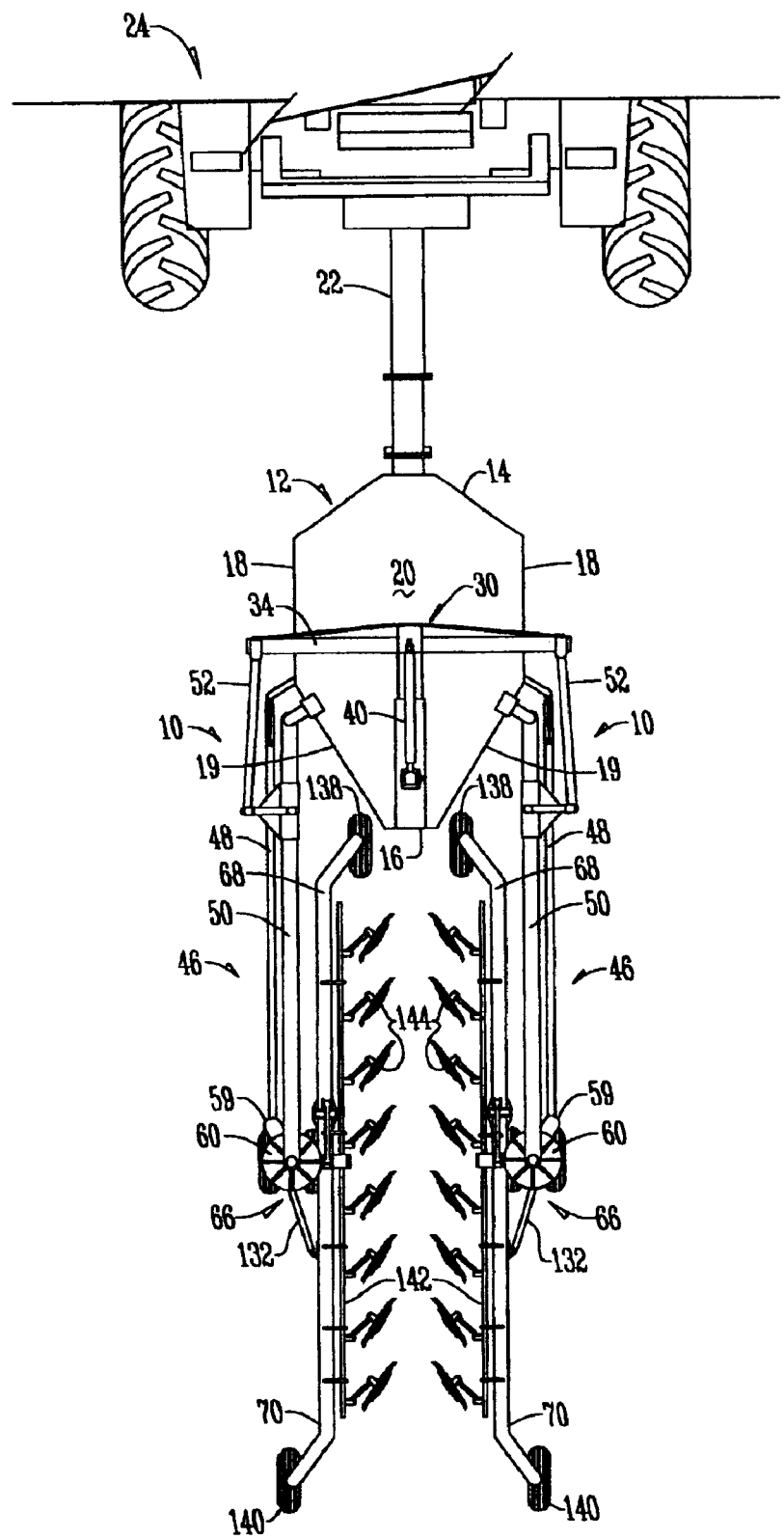
FIG. 1 is a plan view showing the hay rake of this invention in a travel mode.
Figure 2:
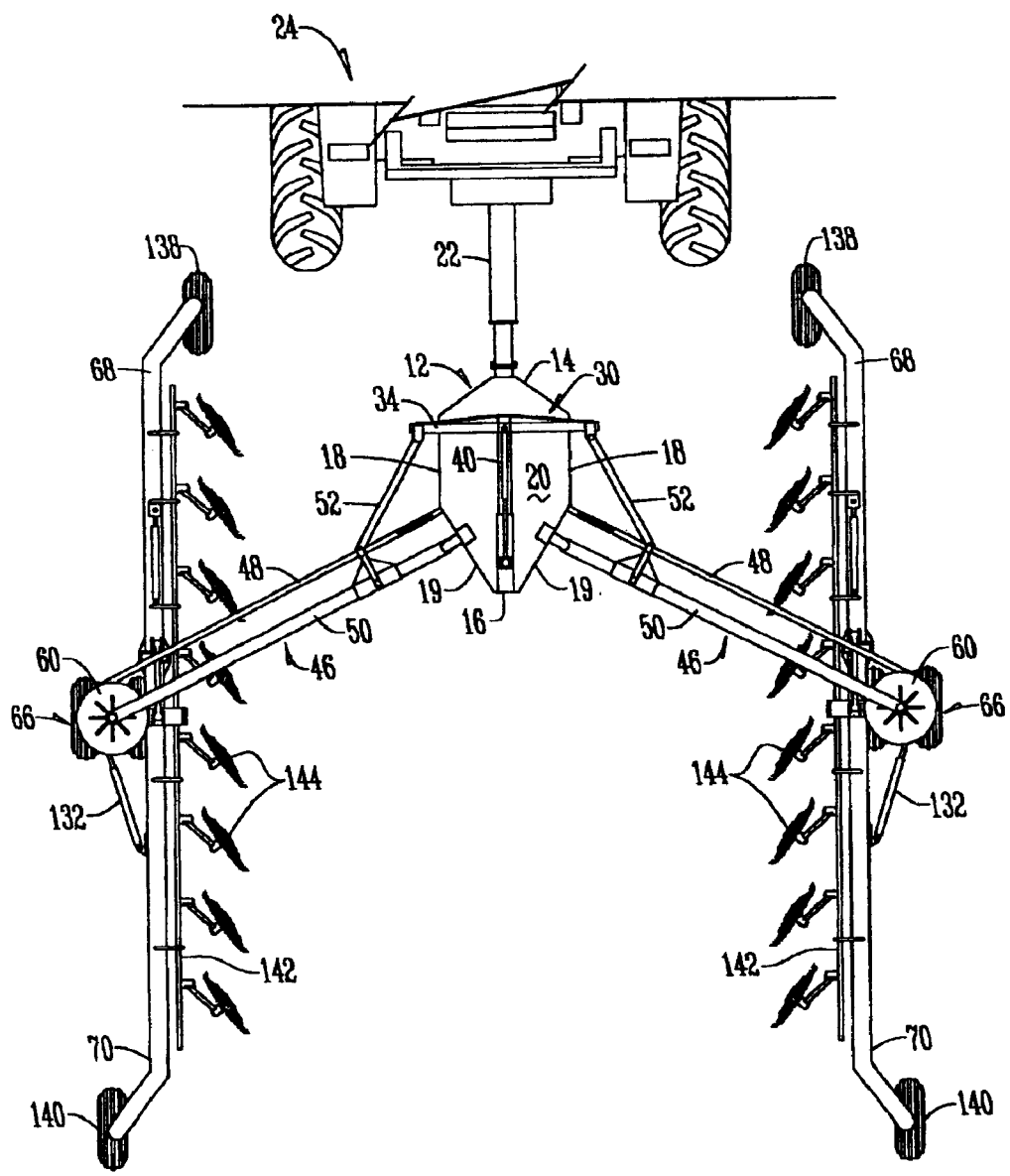
FIG. 2 is a plan view similar to that of FIG. 1 but shows the hay rake of this invention in a first mode of being moved into an operational condition.

As shown in FIGS. 1–8, parallelogram-configured wings 46 are comprised of leading beam 48 and trailing beam 50 which are pivotally secured by their inner ends in spaced parallel relationship to both diagonal sides 19 of base frame 12. Each wing 46 is adapted to nest in a travel position of FIG. 1, and to be pivoted outwardly from the base frame 12 at an angle of approximately 60° when in the raking position of FIG. 3. Tie members or struts 52 are pivotally connected to the end of beam 34, and are pivotally connected by their other ends to trailing beam 50. The wings move from the travel position in FIG. 1 to the raking position of FIG. 3 by moving T-beam 30 from a rearward position (FIG. 1) to a forward position (FIG. 2). The leading beam 48 is length adjustable as shown in FIG. 5 (see numeral 54, FIG. 8) an increment of approximately one inch by cylinder assembly 56 as will be discussed hereafter.

Figure 9:
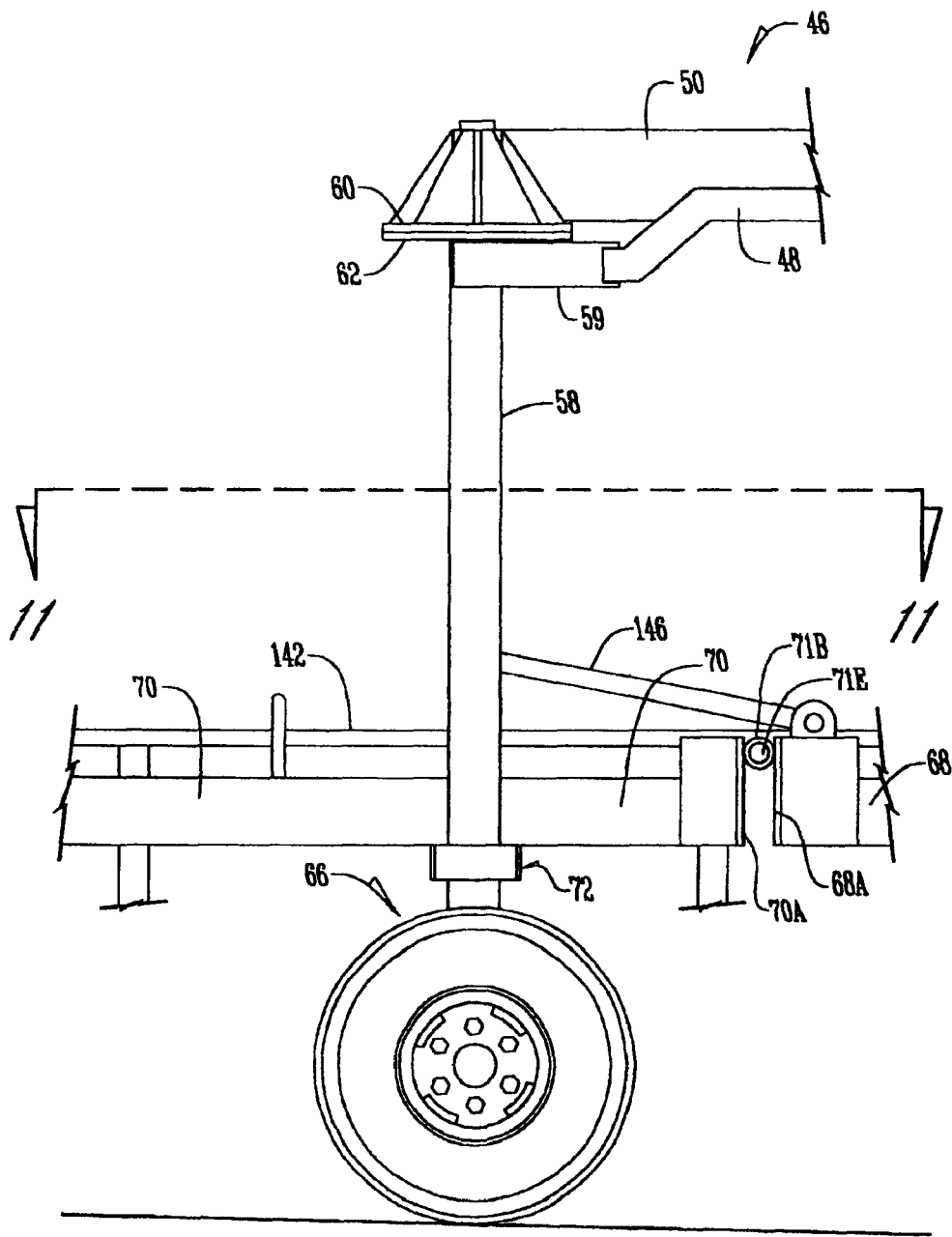
FIG. 9 is an elevational view of the post that extends upwardly from positioning wheels, and related components.
Figure 10:
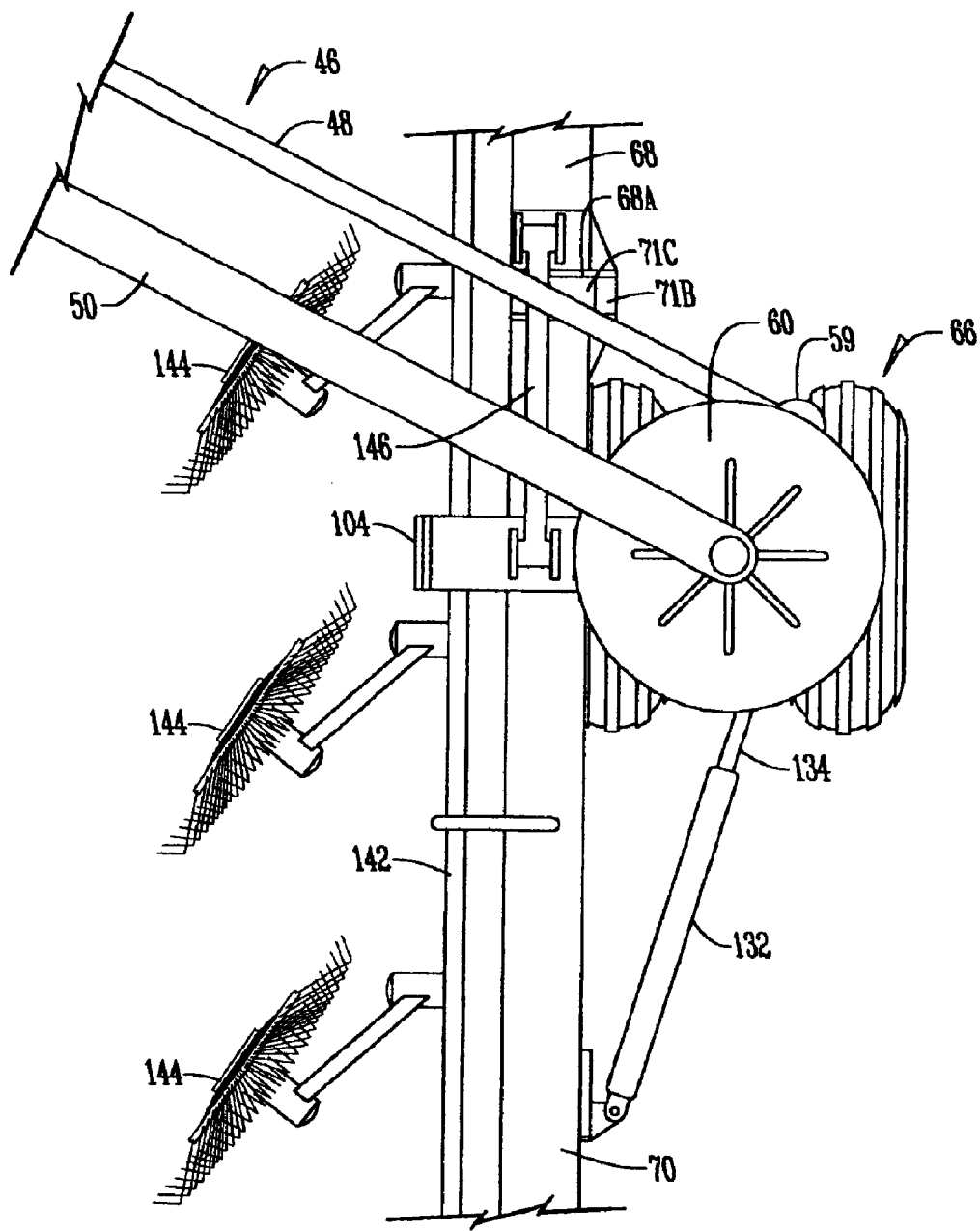
FIG. 10 is a plan view as seen from above of the apparatus of FIG. 9.

As shown in FIGS. 9 and 10, the outer end of trailing beam 50 is pivotally secured to the top end of steel post 58. Link 59 is pivotally connected by its ends to the outer end of forward beam 48 and post 58. Thus, the parallelogram-configuration of the wings 46 is defined by the pivotal connection of the inner ends of the leading and trailing beams to the base frame 12, and the outer ends thereof pivotally connected by link 59. The longitudinal axis of link 59 is parallel to side 19 of base frame 12 (FIG. 1).

As best shown in FIG. 9, a horizontal gusset plate 60 is rigidly secured to the outer end of trailing beam 50, and rotationally mates with a similar gusset plate 62 on the top of post 58. A suitable vertical pivot shaft (not shown) extends upwardly from the top of post 58 through the gusset plates 60 and 62 which serve to strengthen the pivoted connection between the end of trailing beam 50 and post 58.

The lower end of post 58 is secured to axle 64 which rotatably supports positioning wheels 66. This arrangement serves to equally balance the downward load on post 58 on the wheels 66.

Forward and rearward rake arms 68 and 70, respectively are pivotally joined together by hinge assembly 71 (FIG. 16B) adjacent their inner ends 68A and 70A and are always in elongated alignment. An inner end plate 71A is secured to the inner end 68A of rake arm 68 to which spaced hinge sleeves 71B are secured. Sleeves 71B on plate 68A mates with tube 71C which is welded to inner end plate 70A. Hinge pin 71E extends through sleeves 71B and tube 71C to pivotally secure the rake arms together.

Figure 13:
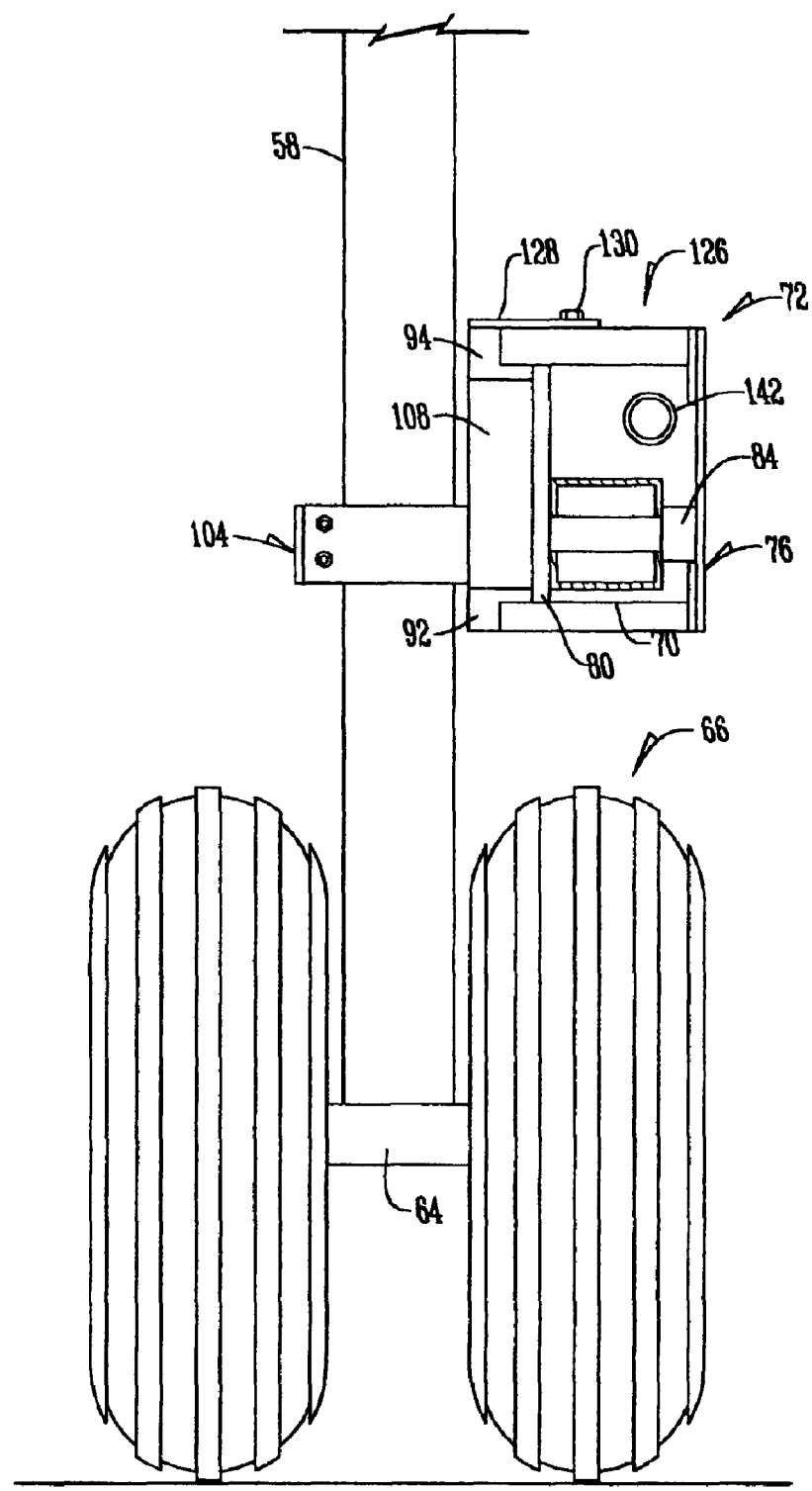
FIG. 13 is an elevational view of the positioning wheels and the pivotal assembly attached to the upstanding post as seen from a forward direction.
Figure 14:
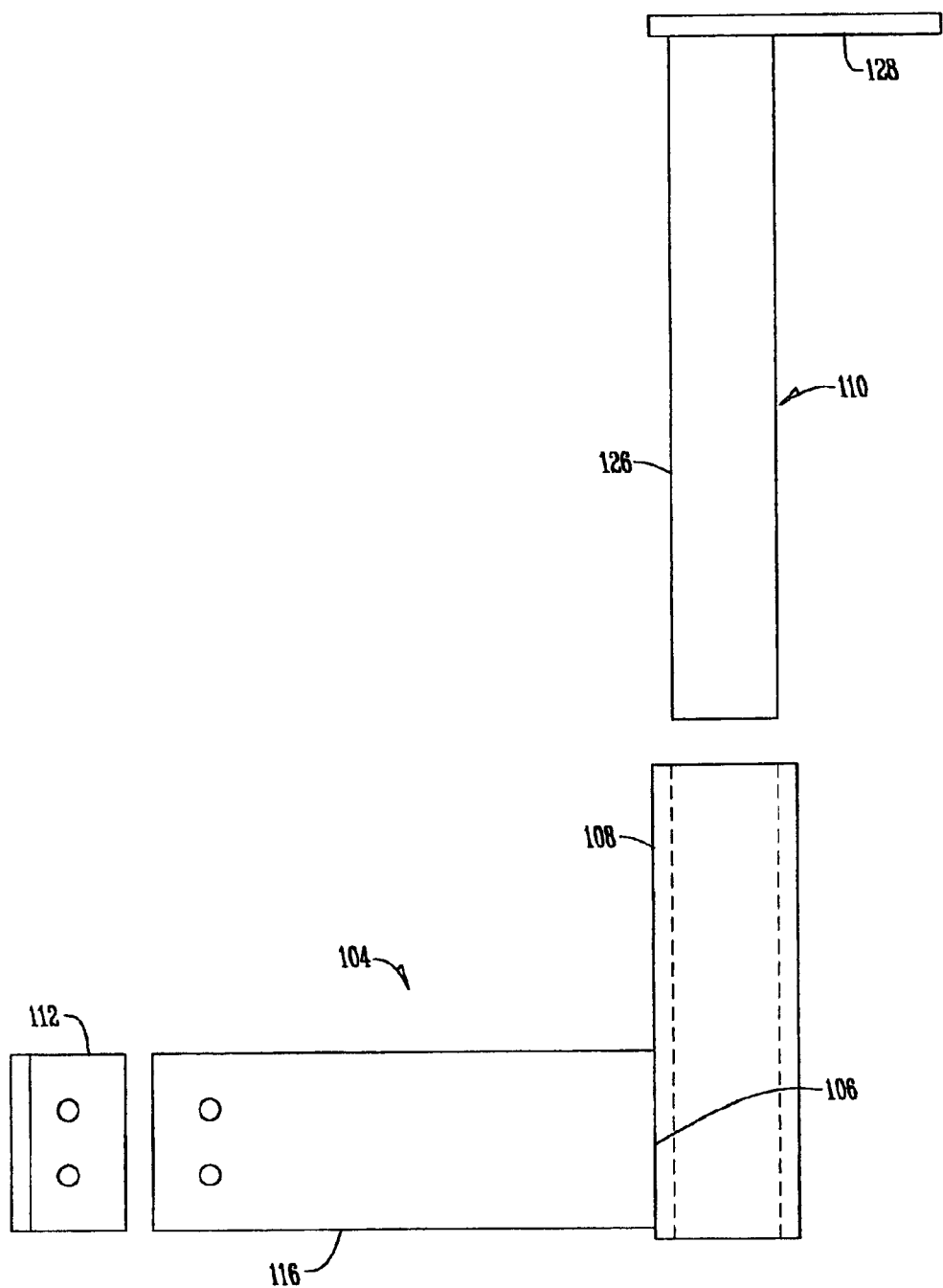
FIG. 14 is an elevational view of component parts of the pivotal assembly.
Figure 15:
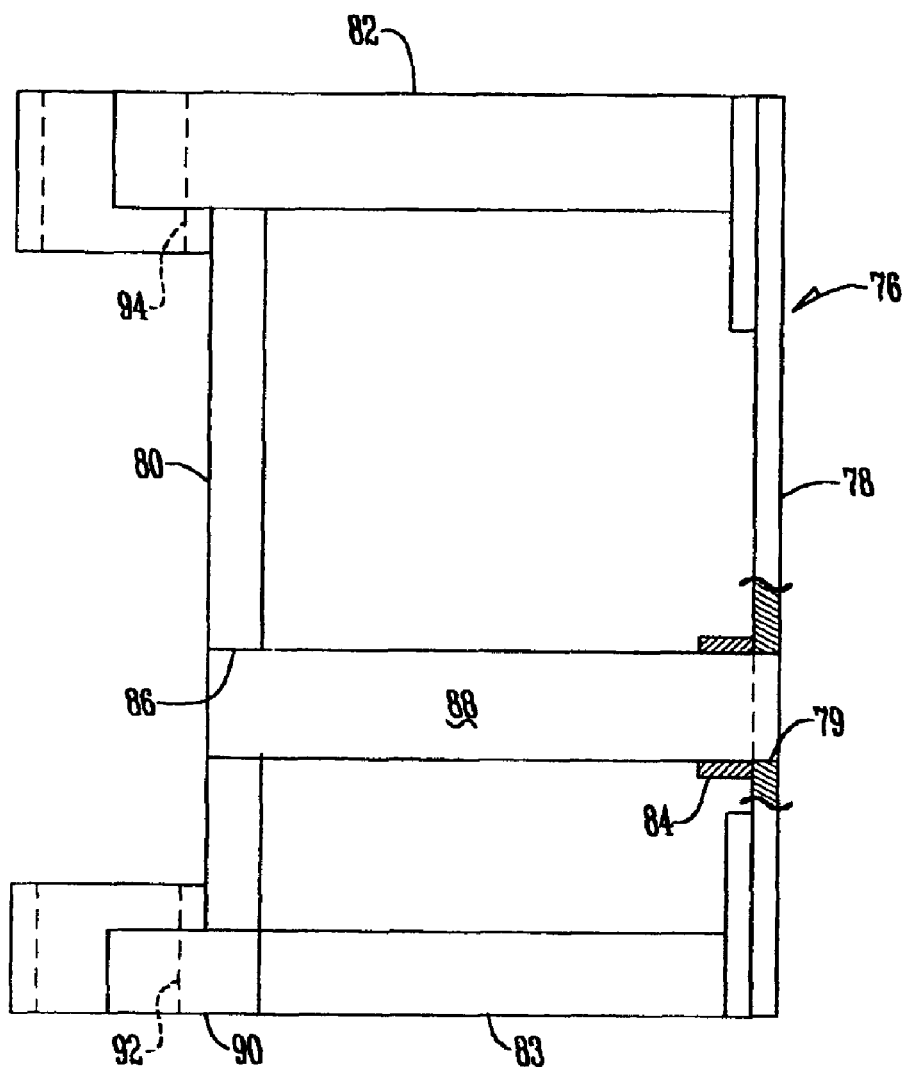
FIG. 15 is an elevational view of other component parts of the pivotal assembly.

As will be discussed hereafter, the pivot assembly 72 is pivotally attached to post 58 just above the level of positioning wheels 66. (FIG. 13). Pivot assembly 72 (FIGS. 15 and 16A) includes a subframe 76 which is vertically disposed and has vertical sides 78 and 80, a top member 82, and a bottom member 83. A stub bearing sleeve 84 with a horizontal center axis is welded to the lower inside surface of side 78 and is centered on an aperture 79 in side 78 in alignment with aperture 86 to receive pin 88. Pin 88 is used to pivotally connect the inner end of rake arm 70 to assembly 72 by extending through a corresponding horizontal aperture (not shown) in the end of rake arm 70 when the aperture in the end of the arm 70 registers with aperture 79, sleeve 84 and the aperture 86 in the lower end of side 80. This assembled condition is shown in FIGS. 15 and 16.

A horizontal bracket 90 is welded to the bottom of side 80 and has a hollow vertical sleeve bearing 92 (FIGS. 15 and 16A) welded thereto adjacent an outer end of the bracket. The sleeve bearing 92 is in vertical alignment with a similar sleeve bearing 94 that is welded to an extension of top member 82 (FIG. 15).

Figure 11:
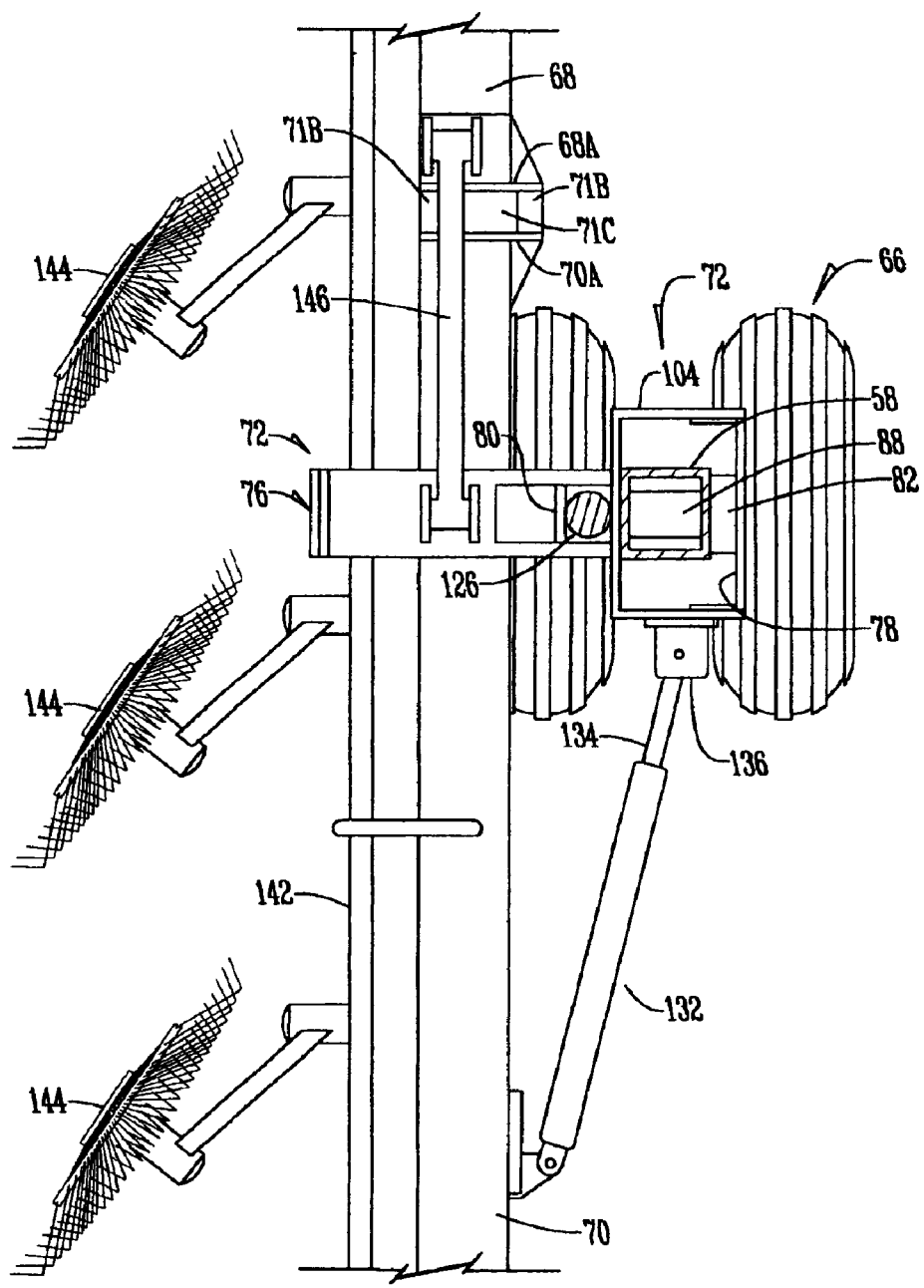
FIG. 11 is a sectional view of the pivotal assembly between the upstanding posts, the positioning wheels, and the separate hay rake arms, taken on line 11—11 of FIG. 9.
Figure 16:
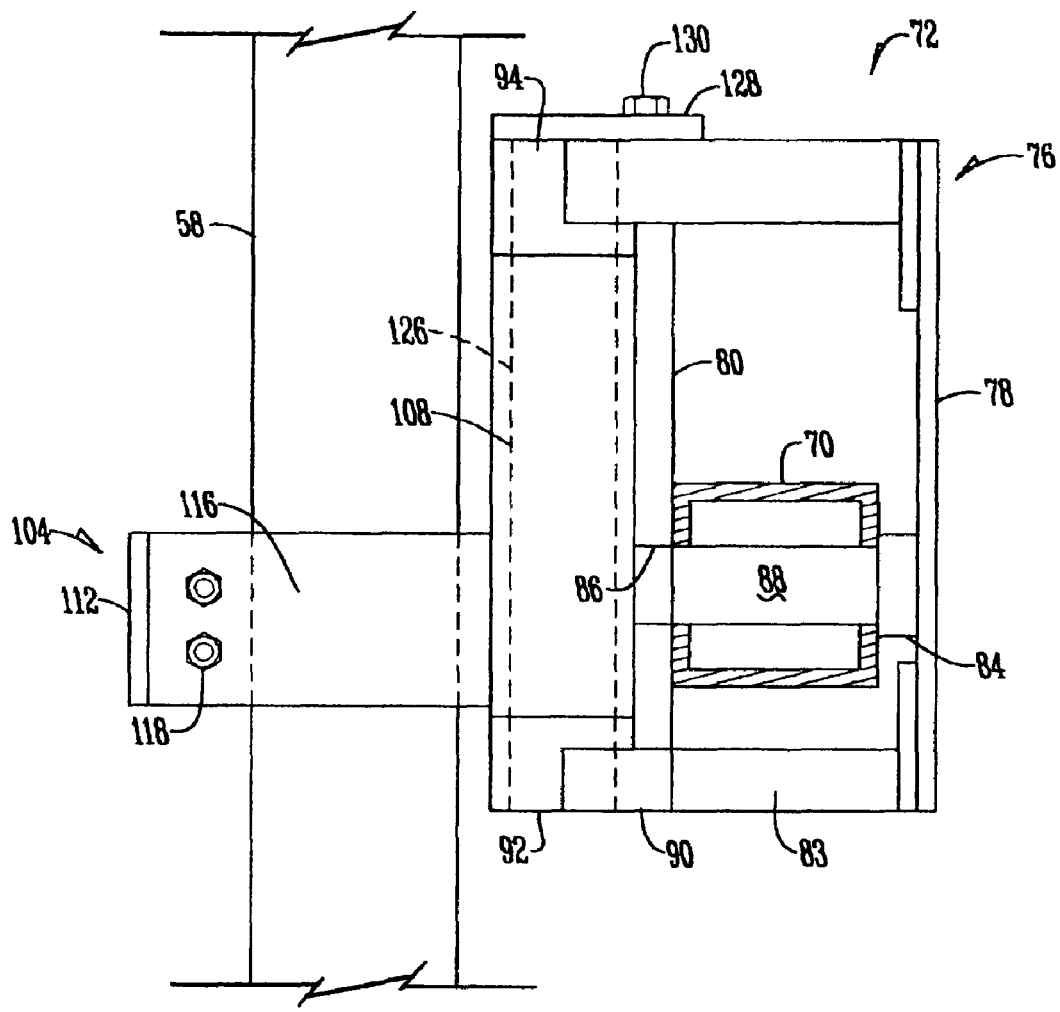
FIG. 16 is a forwardly looking elevational perspective view of the assembled pivotal assembly.
Figure 16A:
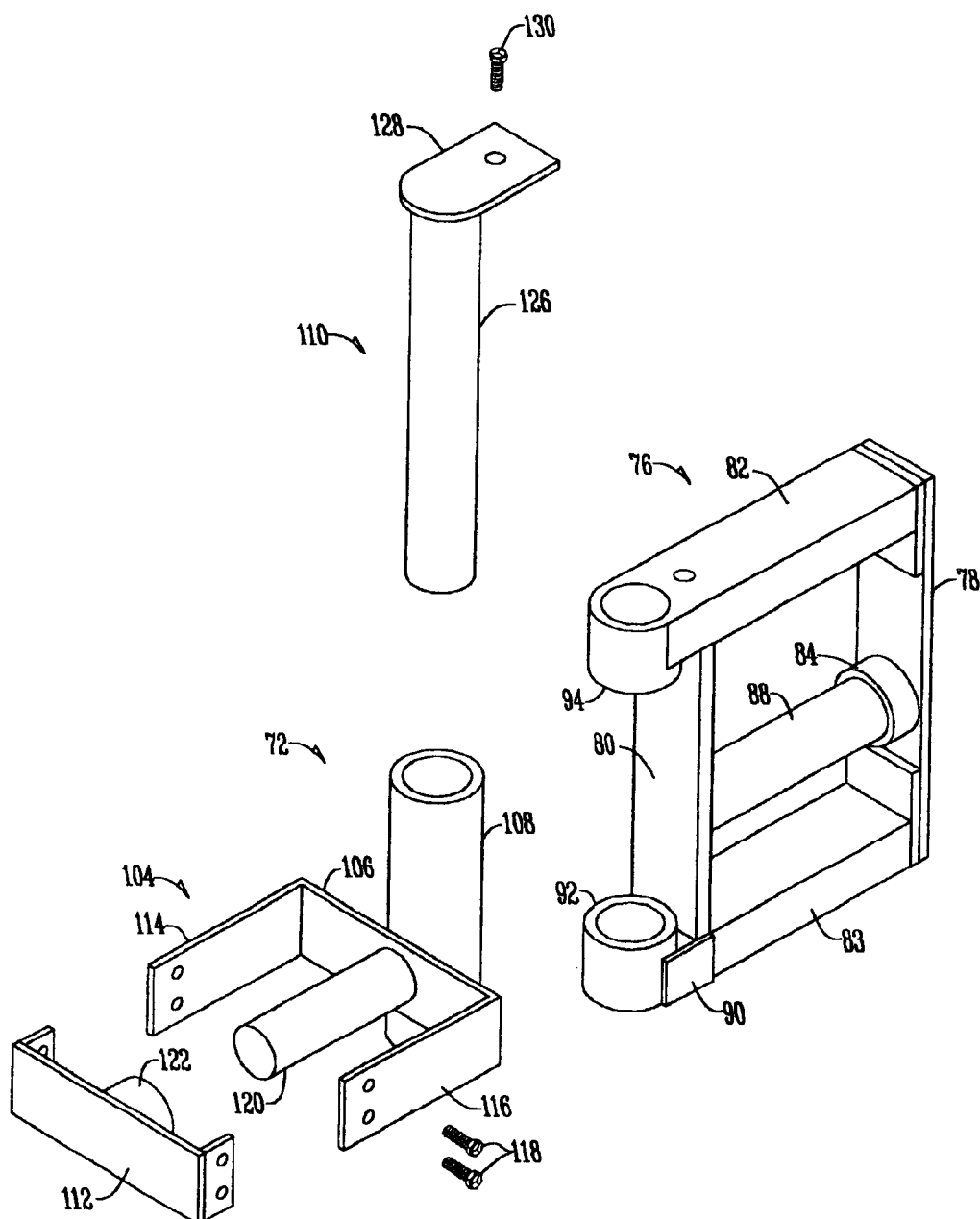
FIG. 16A is an exploded perspective view of the pivotal assembly.
Figure 16B:
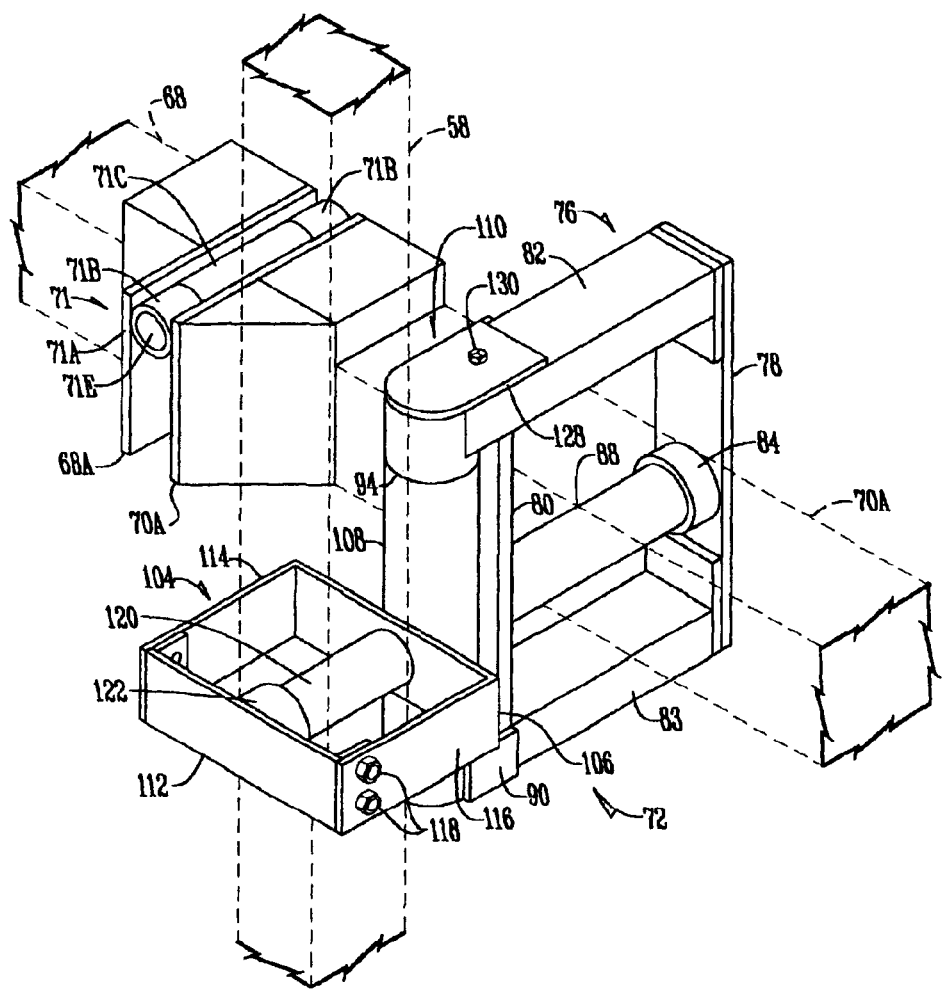
FIG. 16B is a perspective view of the assembled pivoted assembly.

Pivot assembly 72 has an additional subframe 104 which extends around post 58 and which is pivotally secured to subframe 76 about a horizontal axis (FIGS. 16 and 16B). Subframe 104 is rectangular in shape and normally dwells in a horizontal plane. It has an inner side 106 to which a vertical sleeve 108 and detachable pin 110 (FIG. 16A) are a part; an outer side 112, a rear side 114, and a front side 116 (FIGS. 16A and 16B). The side 112 is detachably secured to the rearward and forward sides 114 and 116, respectively by bolts 118 (FIG. 11). A horizontal stub shaft 120 is welded to an inner surface of side 106 (FIG. 16A) to be pivotally and slidably received in hollow horizontal bearing sleeve 122 welded to and extending through post 58. As shown in FIGS. 11 and 16B, pin 88 pivotally extends through apertures (not shown) in rake arm 70. This assembly, shown in FIG. 16B, pivotally secures the subframe 104 to post 58 for limited rotation of the post with respect to the subframe 76. Ample clearance is provided between forward side 114 and rearward side 116 for this pivotal movement. The engagement of stub shaft 120 with bearing sleeve 122 maintains the position of post 58 against the inner surface of side 106. Removal of bolts 118 will permit side 112 to be removed from the subframe to service or lubricate the shaft 120 or the bearing sleeve 122 as may be required.

The vertical bearing sleeve 108 welded to the outer surface of side 106 (FIG. 16B) is of a size to fit between the vertically disposed opposite bearing sleeves 92 and 94 on subframe 76 shown in FIG. 16A. A pin 126 with pin latch bar 128 is held in place by bolt 130 to detachably pivot subframe 104 to subframe 76 (FIG. 16A). Thus, pivot assembly 72 is comprised of subframes 76 and 104 which are secured together about pin 126 for limited swinging about the vertical axis of pin 126 (FIG. 16A).

Figure 3:
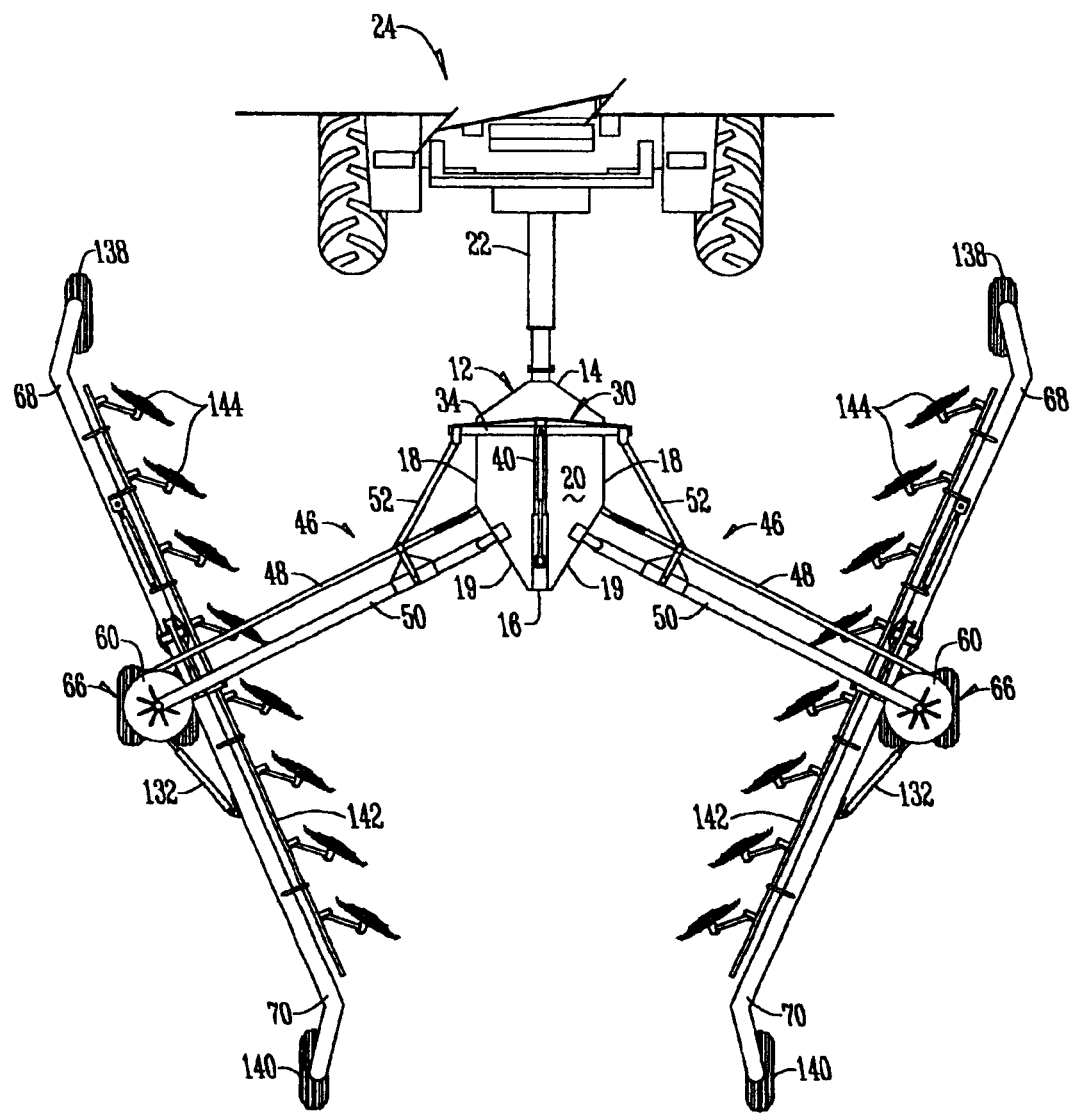
FIG. 3 is a plan view similar to FIGS. 1 and 2 but shows the hay rake of this invention in a complete operational position.
Figure 4:
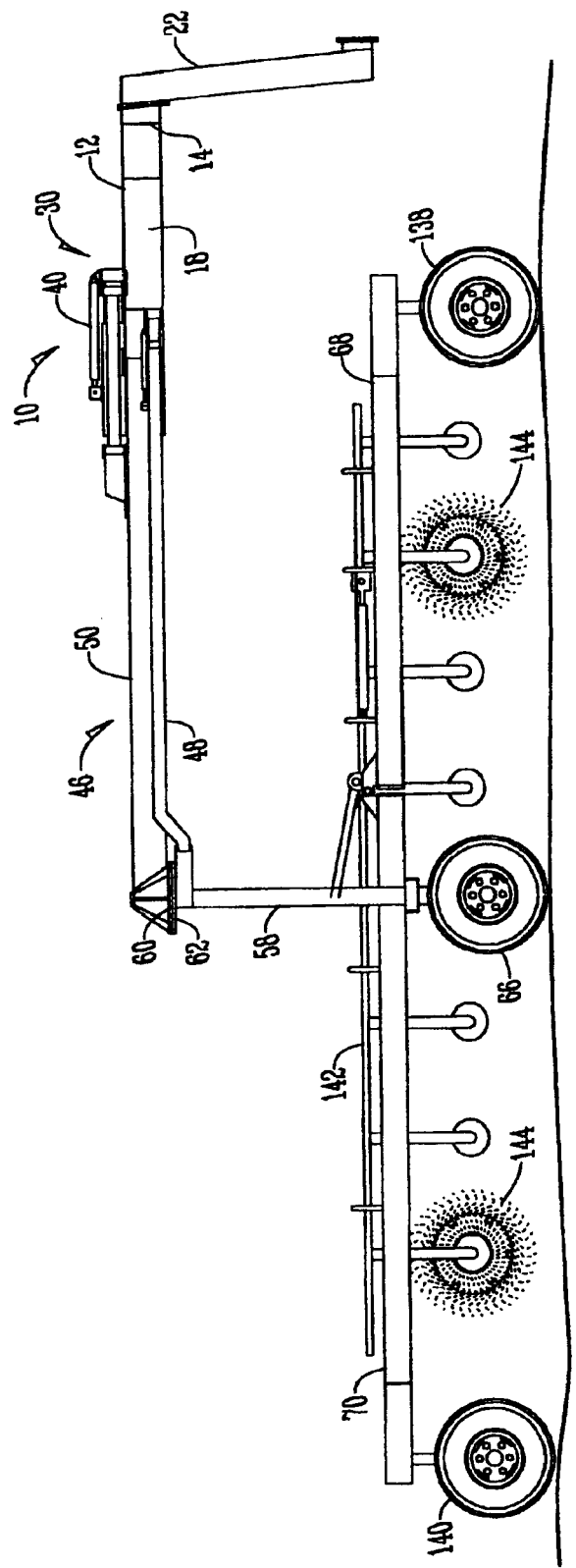
FIG. 4 is a side elevational view of FIG. 2.
Figure 12:
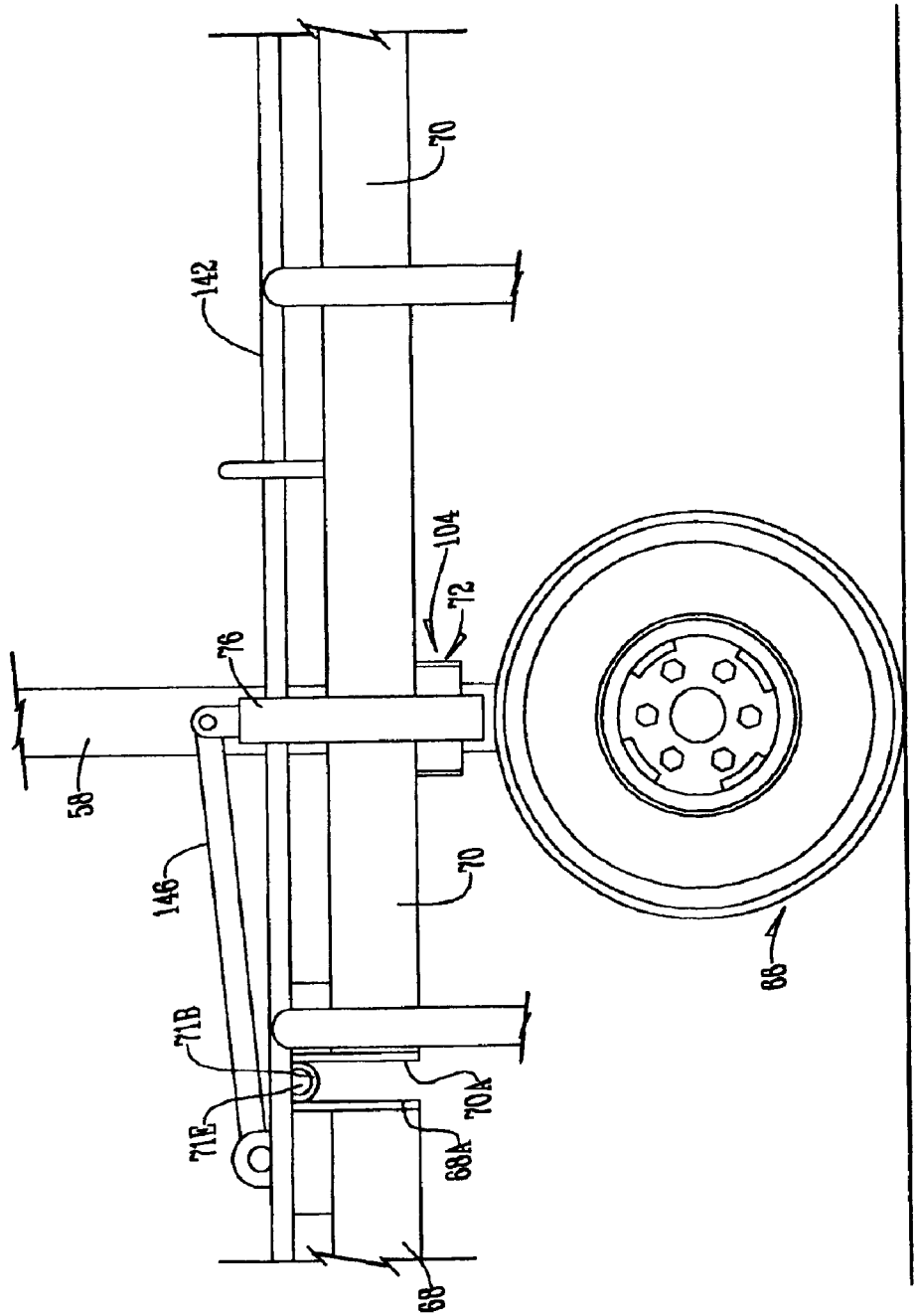
FIG. 12 is an elevational view taken from the opposite direction of the subject matter of FIG. 11.

The rake arms 68 and 70 can rotate about the vertical axes of pin 126 of subframe 104 so that the angular orientation thereof as shown in FIGS. 1–3 can take place. For stabilization purposes, a stabilizer bar 146 (FIG. 12) extends between subframe 76 and rake arm 68 which serves to maintain subframe 76 in a vertical position at all times when hay arms 68 and 70 pivot in a vertical plane with respect to each other. The bar 146 is pivotally secured by its ends (FIG. 12) to subframe 104 and rake arm 68.

Thus, the attitude of the positioning wheels 66 is maintained at all times by the parallelogram-configured wing structures 46 via the post 58. However, the separate rake arms 68 and 70 can be pivoted through hinge assembly 71 (FIG. 16B) both upwardly and downwardly as terrain features require. The arms 68 and 70 can be rotated horizontally on pin 126 between the positions shown in FIG. 1 and FIGS. 2 and 3 between travel and operational positions without stressing in any destructive way the pivotal assembly 72.

With reference to FIG. 11, a hydraulic cylinder 132 with piston rod 134 extends between frame 104 and rake arm 70 with universal connections at the ends of the piston rods and cylinders. The cylinders 132 cause the horizontal combined rotation of the arms 68 and 70.

Castor wheels 138 are mounted on the forward ends of leading rake arms 68. Similarly, castor wheels 140 are mounted on the rearward ends of trailing rake arms 70.

Figure 19:
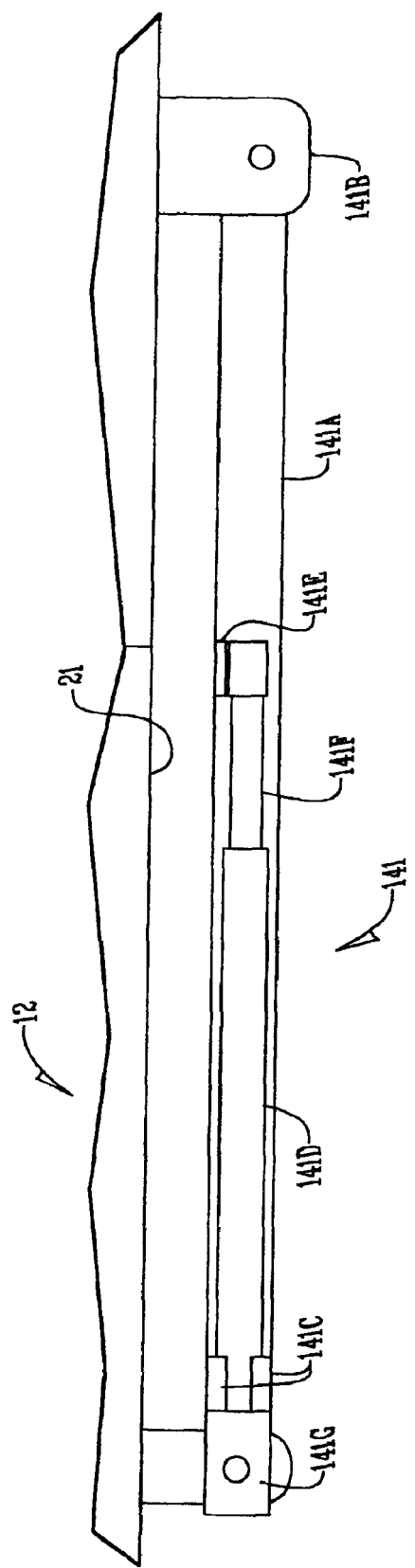
FIG. 19 is a side elevational view of the stabilizer frame of FIG. 17 when in an inoperative stored position underneath the base frame.

With reference to FIGS. 17–19, a V-shaped stabilizer frame 141 with side diagonal side members is pivotally secured by the upper ends of members 141A to the bottom plate 21 of base frame 12 by members 141B so as to be located in a horizontal position, (by suitable fasteners, not shown) during the field operations, and to be located in a vertical plane when in a travel mode (FIG. 18). A horizontal bar 141C is welded to the lower ends of member 141A opposite to members 141B. Length adjustable stabilizer bars 141D are pivotally secured to the ends of bar 141C and can be detachably folded and retained by pin or chain number 141E in an inoperative position as shown in FIG. 17. However, the bars 141D can be moved to the position of FIG. 18 when in the travel mode, and the free ends thereof can be coupled to the front ends of leading rake arms 68 by extension members 141F to provide some lateral stiffness between the lateral position of the castor wheels 138 as the device is being towed in the travel mode of FIG. 1. When not in use, the frame 141 is detached from the hay arms 68, and folded back to the position shown in FIGS. 17 and 19. The frame is detachably held in the position of FIGS. 17 and 19 by clevis 141G.

Conventional lift tubes 142 (FIG. 4) are operationally connected to hay rake wheels 144 and are adapted through conventional means (not shown) to raise the wheels 144 off of the ground for traveling, and to engage the ground during raking.

It should be understood that the farm tractor 24 is equipped with one or more hydraulic circuits to separately control the hydraulic cylinders 40, 56 and 132. This circuitry has not been shown in the drawings but is well within the expertise of one skilled in the art. The cylinders 56 are hydraulically coupled together in conventional fashion in a slave mode, so that they operate in unison. This can also be true of the cylinders 132 although it is sometimes desirable to have an override mechanism so that they can be independently operated if desired.

In operation, the rake 10 is towed to the hay field in which it is to function by farm tractor 24 through a conventional coupling between the tongue 22 and the drawbar of the tractor. The hydraulic lines of the cylinders on the rake are operationally connected to the hydraulic circuit or circuits of the tractor, all of which are controlled from the tractor by the operator. FIG. 1 is a plan view of the hay rake of this invention in its transport position.

Upon entering the field where the raking is to take place, the lift tubes 142 are moved to lower the rake wheels 144. The hay in the field will have been previously cut and cut or placed in a plurality of windrows which are substantially parallel. The purpose of the rake of this invention is to gather together or combine the cut hay from a plurality of windrows into a single windrow for baling whereupon the original windrows are tumbled or turned to facilitate their further drying before the baling is later conducted. Thus, the operator of the tractor aligns the hay rake 10 in the condition shown in FIG. 1 in a direction where the operator expects to make a first pass through the hay field.

The first step in readying the hay rake for operation is to actuate the cylinders 56 to shorten the leading beam 48 of the wing structures 46 slightly (e.g., 1 inch or so) which turns the positioning wheels 66 slightly inwardly. The tractor is then placed in reverse and while backing, the hydraulic cylinder 40 on the base frame 12 is actuated to extend cylinder rod 42 and to move the T-beam 30 forwardly from the positions of FIGS. 5 and 7 to the forward positions of FIGS. 6 and 8. This causes the hay rake to then assume the position shown in FIG. 2 of the drawings. The slight "toeing in" of the positioning wheels 66 causes the hay arms to easily move to this position as the rake moves rearwardly. The cylinder assemblies 56 are then reversed so as to bring the positioning wheels 66 back into a forwardly orientation.

The cylinders 132 are then actuated to cause the rake arms 68 and 70 to pivot from the position shown in FIG. 2 to the position in FIG. 3. The cylinders 132 cause the rearward rake arm 70 to pivot inwardly towards each other. Since the forward rake arms 68 are linked to the rearward rake arm 70 through hinge assembly 71 as described heretofore, the forward rake arm 68 will move outwardly from each other as the rearward rake arms are moving towards each other. The precise angular position can be determined by the operator through the control over cylinders 132.

The lift tubes 142 are thereupon conventionally moved from an elevated position to a lower ground engaging position whereupon the hay rake 10 is ready for operation. All the while, positioning wheels 66 are oriented in a forwardly direction by reason of the parallelogram-configured wing structures 46. The great weight of the various components of the device are centered on the post 58. The subframe 76 is maintained in a precise vertical position by stabilizer bar 146. This vertical orientation serves to substantially reduce the torsion imposed upon the pivot assembly 72 and the posts.

The castor wheels 138 and 140 serve as gauge wheels to maintain the hay rake arms 68 and 70 at the correct height. They also support the ends of the arms during transport as the arms may pivot on pivot assembly 71. The castor wheels work independently of each other to accommodate variations in terrain.

When the tractor hitch or tongue 22 goes upwardly or downwardly, the post 58 will tilt forwardly or rearwardly, respectively, on pin 120 (FIGS. 16A, 16B).

The hay rake of this invention increases the visibly of the operation by the tractor operator. It makes turning easier and quicker. The versatile pivotal abilities of the pivot assembly 72 allow each of the rake arms 68 and 70 to move over terrain features of different elevation. The manner of construction of the hay rake 10 facilitates such repairs as may be required.

To return the hay rake from its operating position of FIG. 3 to its travel position of FIG. 1, the cylinders 132 are reversed to move the rake arm 68 and 70 back to the positions of FIG. 2. The movement of cylinder assemblies 56 as described above is reversed as the hay rake is moved forwardly. The cylinder 40 is then reversed so as to cause the T-beam 30 to move from its forward position to its rearward position (FIG. 6 back to the position of FIG. 5) to cause the travel alignment of FIG. 1 to be assumed. The V-shaped stabilizer frame 141 is moved into its operating position as shown in FIG. 18, and the hay rake is thereupon in its travel mode for removal to another field of hay as soon as the lift tubes 142 are actuated to raise the hay raking wheels 144 upwardly from the ground surface.

It is therefore seen that this invention will achieve at least all of its stated objectives.

We claim:

1. A foldable hay rake, comprising,
   a base frame member having forward and rearward ends, and opposite sides,
   a tongue member secured to the forward end of the base frame for securing the hay rake to a prime mover, a pair of elongated wing arms having inner and outer ends with the inner ends being pivotally secured to the base frame and being adapted to swing outwardly and diagonally with respect to the base frame, an elongated hay rake arm structure pivotally secured to the outer ends of the wing arms, and having a midsection and forward and rearward ends, a plurality of hay rake wheels secured to the hay rake arm structure, positioning wheels pivotally secured to the midsection of the hay rake arm structure, caster wheels pivotally secured to the hay rake structure, adjacent its forward and rearward ends, the wing arms each being comprised of a spaced beam and strut in parallel relation to form a parallelogram configuration, each wing arm being operatively connected by its outer end to a vertically disposed post connected to the positioning wheels to hold the positioning wheels in a forwardly extending direction regardless of the pivotal position of the hay rake arm structure with respect to the base frame and the wing arms, and power means for pivoting the wing arms with respect to the base frame.

2. The foldable hay rake of claim 1 wherein second power means are connected to the hay rake arms and the posts for pivoting the hay rake arms with respect to the posts.

3. The foldable hay rake of claim 1 wherein the hay rake arms are secured to the posts by means of a universal joint.

4. The foldable hay rake of claim 1 wherein the wing arms are pivotal between positions approximately parallel to the sides of the base frame in a travel mode to a V-shape configuration with respect to each other of less than 90° in an operational mode.

5. The foldable hay rake of claim 1 wherein the hay rake arms are comprised of a plurality of separate beam sections, with the position wheels being mounted on a center portion thereof, and castor wheels being mounted on the forward and rearward ends of the endmost beam sections.

6. The foldable hay rake of claim 4 wherein the V-shape configuration comprises a wide forward throat position, and a narrower rearward opening defined by the diagonally positioned hay rake arms.

7. The foldable hay rake of claim 1 wherein the power means comprises a pair of two-way hydraulic cylinders that are connected to permit synchronous movement of the hay rake arms with respect to each other.

8. The foldable hay rake of claim 1 wherein the hay rake arms are comprised of separate arm members pivotally secured to a pivotal assembly secured to the post above the positioning wheels.

9. The foldable hay rake of claim 8 wherein the arm members can pivot in vertical and horizontal planes with respect to the pivotal assembly.

10. The foldable hay rake of claim 9 wherein the post can pivot in a vertical plane with respect to the pivotal assembly.

11. The foldable hay rake of claim 9 wherein the pivotal assembly has a subframe that is vertically disposed and is pivotally secured about a horizontal axis to a first arm of the hay rake adjacent an inner end thereof, means connecting the hay rake arms about a horizontal axis at inner ends thereof, and an elongated stabilizer arm being pivotally secured by opposite ends thereof about horizontal axis to the subframe and the inner end of a second arm of the hay rake to keep the subframe in a substantially vertical position.

12. The foldable hay rake of claim 1 wherein the wing arms hold the posts and the positioning wheels in a forwardly extending position regardless of the pivotal position of the wing arms.

13. The foldable hay rake of claim 12 wherein the struts of the wing members are length adjustable to selectively permit the parallelogram configuration of the wing arms to be skewed to induce a slight deviation of the posts and positioning wheels from a forwardly extending position to facilitate the movement of the hay arms into an angular position with respect to each other.

14. The foldable hay rake of claim 1 wherein a laterally extending beam is on said base frame member, power means for moving the laterally extending beam in a forward or rearward direction with respect to the base frame, and elongated tie rods connecting outer ends of the laterally extending beam to the wing arms to pivot the wing arms from a position approximately parallel to the sides of the base frame to and from an outwardly and diagonally extended position from the base frame to adjust the distance between the posts and the positioning wheels on the opposite ends of the wing arms.

15. The foldable hay rake of claim 1 wherein the positioning wheels comprise at least two spaced apart parallel wheels with a common axle, with the post being secured to the axles.

16. The foldable hay rake of claim 1 wherein flat horizontal mating bearing plates are located at the operative connection between the outer ends of the wing arms and upper ends of the posts.

17. The hay rake of claim 1 wherein each wing arm is secured to an upper end of the posts.

18. The foldable hay rake of claim 11 wherein the means for pivotally connecting the hay rake arms together maintains the hay rack arms in longitudinal alignment with each other.

19. A foldable hay rake, comprising, a base frame member having forward and rearward ends, and opposite sides, a tongue member secured to the forward end of the base frame for securing the hay rake to a prime mover, a pair of elongated wing arms having inner and outer ends with the inner ends being pivotally secured to the base frame and being adapted to swing outwardly and diagonally with respect to the base frame, an elongated hay rake arm structure pivotally secured to the outer ends of the wing arms, and having a midsection and forward and rearward ends, a plurality of hay rake wheels secured to the hay rake arm structure, positioning wheels pivotally secured to the midsection of the hay rake arm structure, each wing arm being operatively connected by its outer end to a vertically disposed post connected to the positioning wheels, a pivotal assembly mounted on each of said post above said positioning wheels, the pivotal assembly including horizontal and vertical subframes pivotally secured together about a vertical axis, the vertical subframe being pivotally secured to the rake arm structure about a horizontal axis, the hay rake arm structure being comprised of at least two arm members pivotally secured at inner ends to pivot about a horizontal axis, and one of the arm members being pivotally secured about a horizontal axis to the vertical subframe adjacent its inner end.

20. The foldable hay rake of claim 19 wherein power means is on said base frame member for pivoting the wing arms with respect to the base frame.

21. The foldable hay rake of claim 19 wherein power means are connected to said horizontal subframe and one of the arm members for pivoting the hay rake structures in a horizontal plane with respect to the wing members.

22. The foldable hay rake of claim 19 wherein an elongated stabilizer bar is pivotally secured to its ends to the vertical subframe and a second arm member to keep the vertical subframe in a substantially vertical position.

23. A foldable hay rake, comprising, a base frame member having forward and rearward ends, and opposite sides, a tongue member secured to the forward end of the base frame for securing the hay rake to a prime mover, a pair of elongated wing arms having inner and outer ends with the inner ends being pivotally secured to the base frame and being adapted to swing outwardly and diagonally with respect to the base frame, an elongated hay rake arm structure pivotally secured to the outer ends of the wing arms, and having a midsection and forward and rearward ends, a plurality of hay rake wheels secured to the hay rake arm structure, positioning wheels pivotally secured to the midsection of the hay rake arm structure, caster wheels pivotally secured to the hay rake structure, adjacent its forward and rearward ends, and wherein each wing arm is operatively connected by its outer end to the upper end of a vertically disposed post connected to the positioning wheels, and power means on the base frame and connected to the wing arms for pivoting the wing arm with respect to the base frame.

24. A foldable hay rake, comprising, a base frame member having forward and rearward ends, and opposite sides, a tongue member secured to the forward end of the base frame for securing the hay rake to a prime mover, a pair of elongated wing arms having inner and outer ends with the inner ends being pivotally secured to the base frame and being adapted to swing outwardly and diagonally with respect to the base frame, an elongated hay rake arm structure pivotally secured to the outer ends of the wing arms, and having a midsection and forward and rearward ends, a plurality of hay rake wheels secured to the hay rake arm structure, positioning wheels pivotally secured to the midsection of the hay rake arm structure, a laterally extending beam on the base frame member, power means for moving the laterally extending beam in a forward or rearward direction with respect to the base frame, and elongated tie rods connecting outer ends of the laterally extending beam to the wing arms to pivot the wing arms from a position approximately parallel to the sides of the base frame to and from an outwardly and diagonally extended position from the base frame to adjust the distance between the posts and the positioning wheels on the opposite ends of the wing arms.

25. The foldable hay rake of claim 24 wherein the laterally extending beam is secured at a center portion thereof to a longitudinally extending beam that is longitudinally slidably secured to the base frame, and means for slidably moving the longitudinally extending beam in forward or rearward longitudinal directions.

26. A foldable hay rake, comprising, a base frame member having forward and rearward ends, and opposite sides, a tongue member secured to the forward end of the base frame for securing the hay rake to a prime mover, a pair of elongated wing arms having inner and outer ends with the inner ends being pivotally secured to the base frame and being adapted to swing outwardly and diagonally with respect to the base frame, an elongated hay rake arm structure pivotally secured to the outer ends of the wing arms, and having a midsection and forward and rearward ends, a plurality of hay rake wheels secured to the hay rake arm structure, wheels supporting the hay rake arm structure, the wing arms each being comprised of a spaced beam and strut in parallel relation to form a parallelogram configuration, and power means for pivoting the wing arms with respect to the base frame.

* * * * *